United States Patent Office 3,522,266
Patented July 28, 1970

3,522,266
5-HYDROXYTHIAZOLIDINES
Robert Burns Woodward, 12 Oxford St.,
Cambridge, Mass. 02138
No Drawing. Filed Aug. 22, 1966, Ser. No. 573,891
Claims priority, application Switzerland, Sept. 10, 1965,
12,623/65; Dec. 9, 1965, 16,970/65, 16,972/65; Jan.
13, 1966, 447/66; Feb. 3, 1966, 1,529/66
Int. Cl. C07d 91/16, 99/24; C09b 27/00
U.S. Cl. 260—306.7         5 Claims

ABSTRACT OF THE DISCLOSURE 5-hydroxythiazolidines prepared by treating a saturated cyclic α-hydrazino thioether, in which the hydrazino group is N,N'-disubstituted by esterified carboxyl groups, with an oxidation reagent capable of furnishing an acyloxy group which acyloxy compounds are hydrolyzed to the hydroxy compound. The 5-hydroxy thiazolidines are useful in the synthesis of 7-amino-cephalosporanic acids.

---

The present invention provides a method procedure for the manufacture of acyloxy compounds and the corresponding hydroxy derivatives, which was used in the production of valuable intermediate products and especially in the first production of synthetic 7-amino-cephalosporanic acid and its derivatives, and lends itself particularly well to this peculiar synthesis.

7-amino-cephalosporanic acid corresponds to the formula

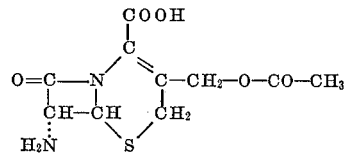

XVI

Derivatives are in the first place N-acyl compounds in which the acyl radicals are primarily those of active N-acyl derivatives of 7-amino-cephalosporanic acid, such as the thienylacetyl, e.g. 2-thienylacetyl, cyanoacetyl, chlorethylcarbamyl or phenylacetyl radical, or acyl radicals that are easy to eliminate, such as the residue of a semi-ester of carbonic acid, for example, the tertiary butyloxycarbonyl residue.

The synthesis of this compound, which is important to the manufacture of valuable medicaments, and of its derivatives is based on the conception to use a 3,5-unsubstituted 2,2-disubstituted thiazolidine 4-carboxylic acid, for example, a compound of the formula

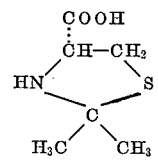

I as the starting material and to carry out the novel synthesis, for example, according to the following scheme of formulae:

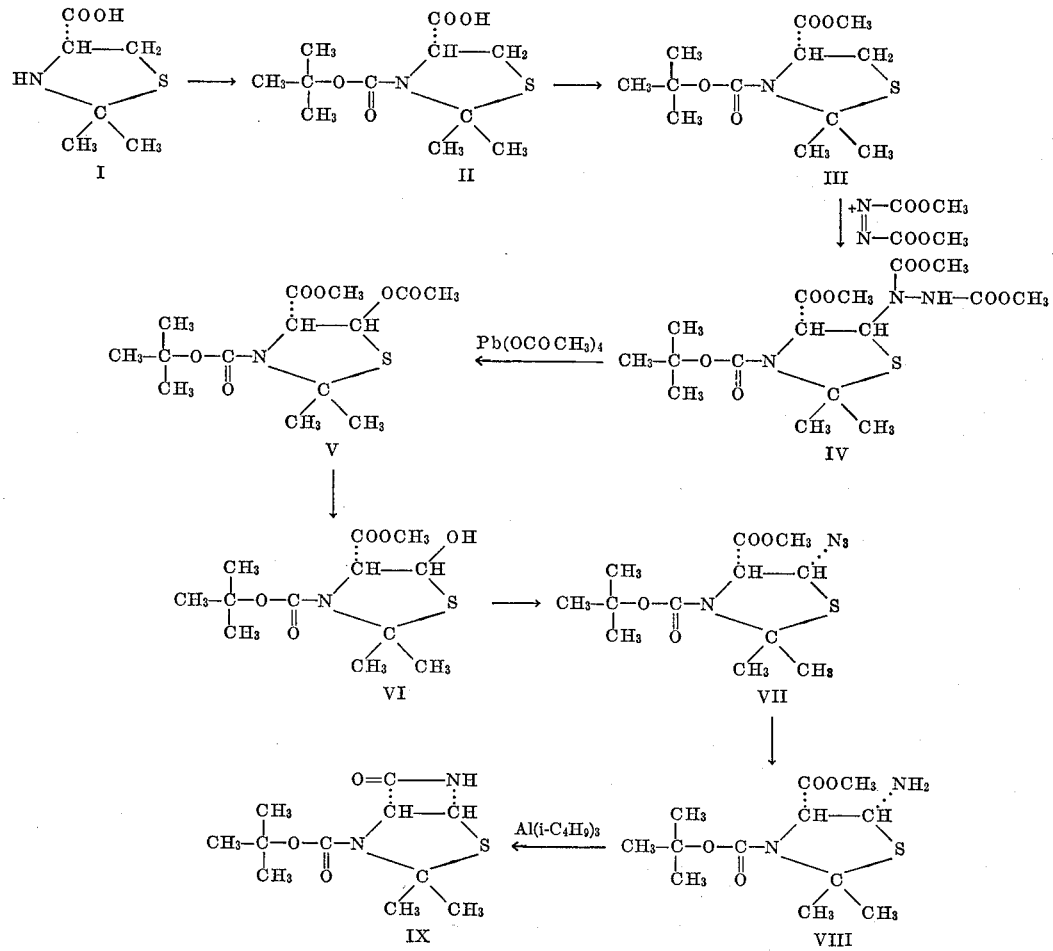

The compound IX is converted into the desired 7-aminocephalosporanic acid and its derivatives as follows:

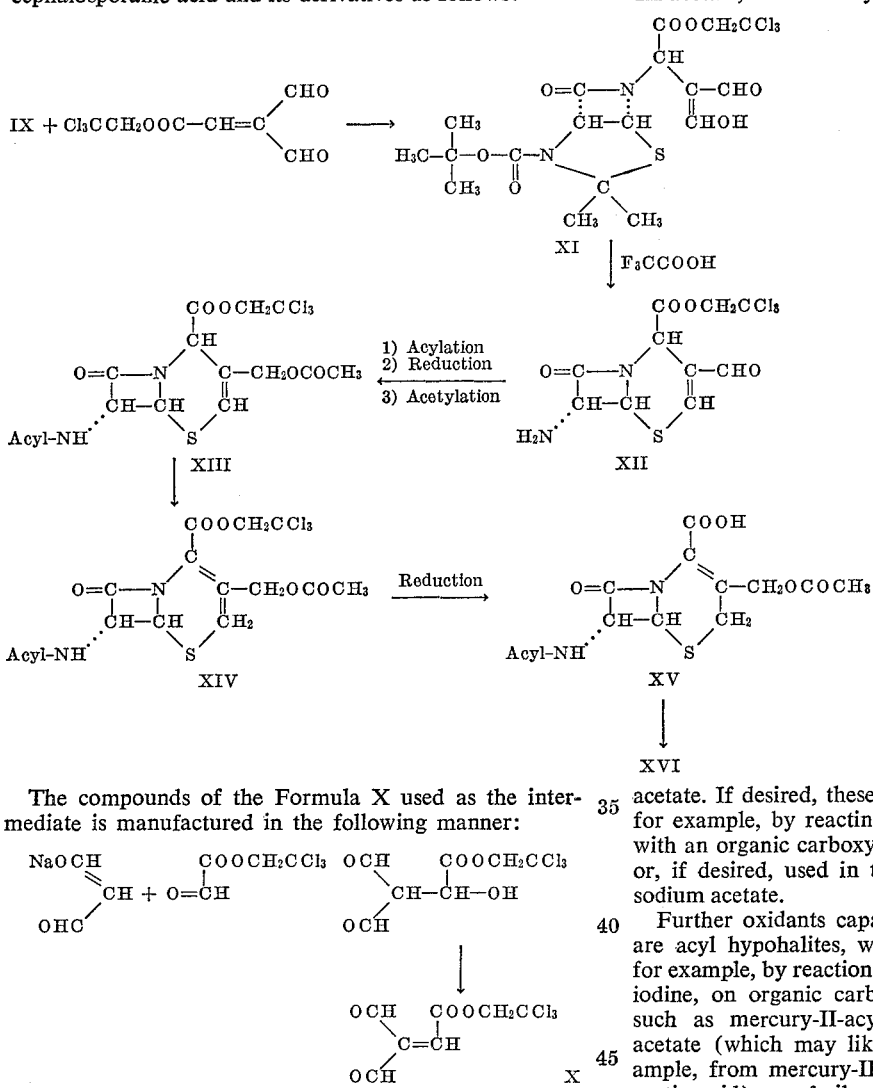

The compounds of the Formula X used as the intermediate is manufactured in the following manner:

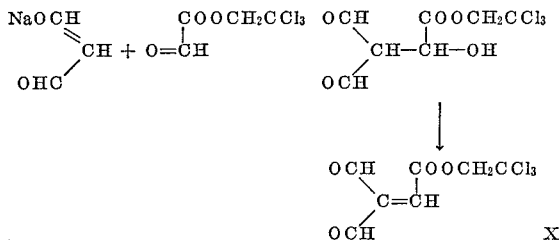

The above mentioned compounds, which are valuable intermediates, for example the compounds of the Formulae V and VI, are unexpectedly obtained when a saturated cyclic α-hydrazino-thioether, in which the hydrazino group is N,N'-disubstituted by esterified carboxyl groups, for example, the compound of the Formula IV, is treated with an oxidation reagent capable of furnishing an acyloxy group and, if desired, in a resulting saturated cyclic α-acyloxy-thioether the acyloxy group is converted into the hydroxyl group, and/or, if desired, in a resulting compound a substituent is converted into another, and/or if desired a resulting mixture of isomers is resolved into its component isomers.

Acyl radicals of an acyloxy group furnished by the oxidation reagent during the reaction are the acyl radicals of organic carboxylic acids, especially of aliphatic carboxylic acids, such as alkane carboxylic acids, especially lower alkane carboxylic acids, in the first place acetic acid or propionic acid, or of aromatic carboxylic acids, such as benzoic acid. These acids are unsubstituted, but may carry further substituents, such as lower alkyl or lower alkoxy groups or halogen atoms or pseudohalogen groups, such as trifluoromethyl groups.

Oxidation reagents capable of furnishing acyloxy groups are in the first place heavy metal acylates with oxidizing properties. Particularly suitable are lead tetraacylates and especially lead tetraacetate, as well as lead tetrapropionate, lead tetrastearate, lead tetrabenzoate, lead tetra-3-bromo-benzoate, as well as thallium-III-acylates, such as thallium-III-acetate, or mercury-II-acylates, such as mercury-II-acetate. If desired, these oxidants may be formed in situ, for example, by reacting lead dioxide or mercuric oxide with an organic carboxylic acid, such as acetic acid, and/or, if desired, used in the presence of a buffer such as sodium acetate.

Further oxidants capable of supplying acyloxy groups are acyl hypohalites, which are usually formed in situ, for example, by reaction of halogen, especially bromine or iodine, on organic carboxylic acids or of salts thereof, such as mercury-II-acylates, for example, mercury-II-acetate (which may likewise be formed in situ, for example, from mercury-II-oxide in the presence of glacial acetic acid) or of silver acylates, such as silver acetate, as well as by the reaction of other agents yielding positive halogen, such as N-halogenoamides or -imides, such as N-bromoacetamide, N-succinimide or N-bromohydantoin on organic carboxylic acids, such as the above-mentioned carboxylic acids, especially acetic acid.

According to the present invention the reaction may consist, for example, in treating the starting material with the appropriate quantity, that is to say at least 2 mol equivalents, of the oxidation reagent capable of furnishing acyloxy groups, conventionally in the presence of a suitable diluent, such as benzene, acetonitrile or acetic acid, at room temperature, while cooling or preferably while heating, if necessary, in an inert gas and/or under increased pressure, the conversion into the desired acyloxy-products being carried out stepwise or directly.

Conversion in the resulting products of the acyloxy groups into the free hydroxyl groups is carried out by hydrolysis, alcoholysis, hydrazinolysis or aminolysis. Under certain circumstances the isolation of the acyloxy compound may not be necessary, as it is converted under suitable reaction conditions directly into the desired hydroxy compound. The hydrolysis may be carried out in the absence or preferably in the presence of a basic hydrolysing agent, such as an alkali or alkaline earth metal hydroxide, for example, sodium or potassium hydroxide, or an alkali metal or alkaline earth metal carbonate or hydrogen carbonate, for example sodium or potassium carbonate or hydrogen carbonate, or of an organic base such as pyridine or triethylamine; it may also take place when the starting material is treated with an adsorbent which is charged with water or just moist, such as a diatomaceous earth preparation (Florisil). Alcoholysis, for example by means of a lower alkanol such as methanol or ethanol, may be carried out in the presence of a transesterifying catalyst, such as a metal salt, for example alkali metal salt, such as sodium or potassium salt, or of an ammonium salt of a carboxylic acid, especially of a lower alkane-carboxylic acid, such as acetic acid, or of an arylcarboxylic acid, such as benzoic acid. Hydrazinolysis and aminolysis are achieved by treatment with hydrazine and with ammonia or a primary or secondary amine, respectively.

The above-mentioned reactions are carried out in the presence or absence of a diluent (in which case the splitting reagent, for example a lower alkanol, may also serve as solvent), if necessary while cooling or heating and/or in an inert gas and/or under superatmospheric pressure.

It was also unexpectedly found, that, when starting with a 2,2-disubstituted L-3-acyl-5α-acyloxy-thiazolidine-4-carboxylic acid or a functional derivative thereof, as well as a corresponding 2,2-disubstituted L-3-acyl-5β-acyloxy-thiazolidine-4-carboxylic acid or a functional derivative thereof, or a mixture of the two isomers as the preferred starting materials, the 2,2-disubstituted L-3-acyl-5β-hydroxy-thiazolidine-4-carboxylic acids and their derivatives, respectively, are obtained almost exclusively.

In a resulting compound with a free hydroxyl group, the latter can be converted into an acyloxy group, for example, by treatment with a suitable derivative of an organic carboxylic acid, such as a halide or an anhydride thereof, or by converting the hydroxy group into a reactive esterified hydroxy group, such as a halogen, e.g. chlorine or bromine atom (for example, by treatment with a suitable acid halide, e.g. phosgene) or an organic sulfonyloxy group, e.g. methane sulfonyloxy or p-toluene sulfonyloxy group (for example, by treatment with a suitable organic sulfonic acid halide) and treatment of the resulting intermediate with an organic carboxylic acid or preferably a salt, such as an alkali metal salt thereof.

Substituents present in a resulting compound may be converted in known manner into other substituents. Thus, a resulting acid derivative, such as an ester, can be converted into the free acid without removing the acyl group, especially a readily eliminatable acyl group, such as the tertiary butyloxycarbonyl group, in position 3. Thus, a carbo-lower alkoxy, such as the carbomethoxy group, can be hydrolyzed to furnish the free carboxyl group by treatment with a dilute alkali metal hydroxide, such as potassium hydroxide, solution; this conversion into the free carboxyl group may, if desired, be carried out during the splitting of the acyloxy group. Carbodiphenylmethoxy groups may be converted into free carboxyl groups under acidic conditions, for example, in the presence of catalytic amounts of an acid, such as trifluoroacetic acid. Then, a carboxyl group esterified with a 2,2,2-trihalogenoethanol, especially with 2,2,2-trichloro-ethanol, can be converted in a peculiar manner into the free carboxyl group by means of a reducing agent. Suitable reagents are chemical reducing agents, such as nascent hydrogen, obtained, for example, by the action of metals, metal alloys or amalgams upon hydrogen donors, such as zinc, zinc alloys, for example, zinc copper, or zinc amalgam in the presence of acids, such as organic carboxylic acids, for example, acetic acid, or of alcohols, such as lower alkanols, an alkali metal amalgam, for example, sodium or potassium amalgam or aluminium amalgam, in the presence of moist ether or of lower alkanols; furthermore, alkali metals, for example, lithium, sodium or potassium, or alkaline earth metals, for example calcium, in liquid ammonia, if desired or required, with the addition of alcohols, such as a lower alkanol. Furthermore, an ester with a 2,2,2-trihalogeno-ethanol, such as 2,2,2-trichloroethanol may also be converted into the free acid by treatment with strongly reducing metal salts, such as chromium-II-compounds, e.g. chromium-II-chloride or chromium-II-acetate, preferably in the presence of aqueous media containing water-miscible organic solvents, such as lower alkanols, lower alkane carboxylic acids or ethers, for example, methanol, ethanol, acetic acid, tetrahydrofuran, dioxan, ethyleneglycol dimethyl ether or diethyleneglycol dimethylether.

A free carboxyl group present in a resulting compound can be converted in known manner into its functional derivatives, such as its esters, amides, hydrazides or azides. It can be esterified, for example, by treatment with a diazo compound, such as a diazo-lower alkane, for example diazomethane or diazoethane, or a phenyl-diazo-lower alkane, for example, diphenyl-diazomethane, or by reaction with a hydroxy compound suitable for esterification, for example an alcohol, a phenol compound or an N-hydroxy-nitrogen compound, for example, a hydroxamic acid, in the presence of an esterifying agent, such as a carbodiimide, for example, dicyclohexyl carbodiimide, or of carbonyl diimidazole or by any other known and suitable esterifying process, such as reaction of a salt of the acid with a reactive ester of the hydroxy compound, especially of an alcohol, and a strong inorganic acid or strong organic sulphonic acid, if desired, in the presence of a salt-forming base. Amides are prepared in known manner, sulphonylamides at the acyloxy stage, for example, by treating the free carboxylic acid with a sulphonylisocyanate.

A functionally modified carboxyl group in a resulting compound can be converted in known manner into another functionally modified carboxyl group, for example, into an esterified carboxyl group by transesterification, such as treatment, with a hydroxy compound in the presence of a transesterification catalyst. Furthermore, esters and especially activated esters, for instance, esters with N-hydroxy-nitrogen compounds, or anhydrides formed with halo-genoformic acid esters, can be converted by reaction with other hydroxy compounds, such as alcohols or phenol compounds, as well as with ammonia, or with primary or secondary amines or hydrazines into other esters and amides or hydrazides, respectively. In a resulting amide or hydrazide compound with a nitrogen atom containing hydrogen, such nitrogen atom can subsequently be replaced, for example, by treatment with a reactive esterified alcohol, or, primarily in an amide or hydrazide compound of the acyloxy series, by treatment with a carboxylic or sulphonic acid derivative, such as an acid halide or by means of another suitable reagent. An N-unsubstituted amide derivative of the acyloxy series can be converted into the corresponding nitrile, for example, by dehydration.

A resulting mixture of isomers can be resolved into the individual isomers in known manner, for example by fractional crystallization, adsorption chromatography (column or thin-layer chromatography) or by other methods. Resulting racemates can be resolved into the antipodes by forming a mixture of diastereoisomeric salts with optically active, salt-forming agents, separating the mixture into the diastereoisomeric salts and conversion of the isolated salts into the free compounds.

The compounds obtained by the present process are saturated cyclic α-acyloxy-thioethers, for example, 5-acyloxy-thiazolidines, and especially 2,2-disubstituted 3-acyl-5-acyloxy-thiazolidine-4-carboxylic acids and functional derivatives thereof, such as the compounds of the formula Va

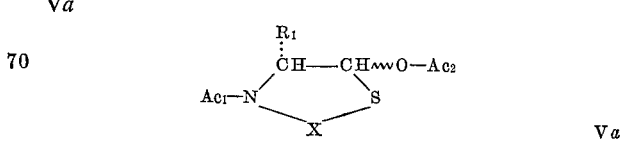

as well as saturated cyclic α-hydroxy-thioethers, such as 5-hydroxy-thiazolidines, and particularly 2,2-substituted 3-acyl-5-hydroxy-thiazolidine-4-carboxylic acids and functional derivatives thereof, such as the compounds of the Formula VIa

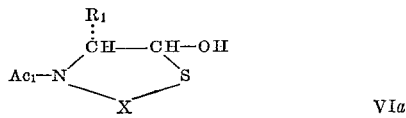

VIa where $Ac_1$ represents an acyl radical, especially the acyl radical of an active N-acyl derivative of cephalosporanic acid, such as the thienylacetyl, e.g. 2-thienylacetyl, chlorethylcarbamyl or phenylacetyl radical, or an easily eliminable acyl radical, such as the residue of a carbonic acid semiester, for example, the tertiary butyloxycarbonyl residue, $Ac_2$ represents the acyl radical of an organic carboxylic acid, such as the acyl radical of the acyloxy group supplied during the reaction, such as the acyl radical of an aliphatic carboxylic acid, for example, of an alkane carboxylic acid, such as a lower alkane carboxylic acid, primarily acetic acid or propionic acid, or of an aromatic acid, such as benzoic acid, which acids are unsubstituted or may contain further substituents, such as lower alkyl or lower alkoxy groups or halogen atoms or pseudohalogens, such as trifluoromethyl groups, X represents the disubstituted carbon atom of the thiazolidine ring and $R_1$ is a free or functionally modified carboxyl group.

The residue —X— represents primarily the group of the formula

where $R_2$ and $R_3$ each stands for a hydrocarbon residue, especially an aliphatic hydrocarbon residue, such as a lower alkyl, for example, ethyl, n-propyl, isopropyl or preferably methyl, or an aromatic group especially a phenyl group, or an araliphatic hydrocarbon residue, especially phenylalkyl, for example benzyl or phenylethyl groups, as well as functionally converted, particularly esterified carboxyl groups, such as carbo-lower alkoxy, e.g. carbomethoxy or carbethoxy groups, or $R_2$ and $R_3$ together may represent a bivalent hydrocarbon residue, especially bivalent aliphatic hydrocarbon residue such as a lower alkylene group, for example 1,4-butylene or 1,5-pentylene, as well as a phthaloyl group, or an oxo or thiono group. The above-mentioned hydrocarbon residues are unsubstituted or may be substituted, for example by lower alkyl, such as methyl or ethyl, by lower alkoxy, such as methoxy or ethoxy groups, halogen such as fluorine, chlorine or bromine atoms, halogenoalkyl, such as trifluoromethyl groups, or by other suitable groups.

The group $R_1$ is a free or preferably a functionally modified carboxyl group, especially an esterified carboxyl group. The latter is esterified with any hydroxy compound suitable for esterifying carboxylic acids, such as with aliphatic alcohols, for example, alkanols, particularly lower alkanols, for example, methanol, ethanol, n-propanol or tertiary butanol, or with cycloaliphatic alcohols, such as cycloalkanols, for example, cyclohexanol, or with araliphatic alcohols, such as phenylalkanols, for example benzyl alcohol or diphenylmethanol, or with phenol compounds especially phenol, or with N-hydroxy-nitrogen compounds, such as hydroxamic acids, for example, N-hydroxycarbamic acid esters, such as its methyl ester, or with N-hydroxy-imides, for example, N-hydroxysuccinimide; the above-mentioned hydroxy compounds may be unsubstituted or substituted by lower alkyl, lower alkoxy, nitro or trifluoromethyl groups or especially by halogen atoms or other groups. Substituted hydroxy compounds particularly suitable for esterifying carboxylic acids are halogenated lower alkanols, such as 2,2,2-trichlorethanol.

Other functionally modified carboxyl groups $R_1$ are, for example, nitrogen-containing functionally modified carboxyl groups, such as carbamyl groups which may be unsubstituted or mono- or disubstituted on the nitrogen atom by aliphatic, alicyclic, aromatic or araliphatic hydrocarbon residues or heterocyclic residues of aromatic character, which may optionally contain lower alkyl groups or free, esterified or etherified hydroxyl groups, such as lower alkoxy, aralkoxy, lower alkanoyloxy or aroyloxy groups or halogen atoms, nitro or trifluoromethyl groups as substituents, such residues being lower alkyl, cycloalkyl, phenyl, phenyl-lower alkyl, phenyl-lower alkylidene or pyridyl residues, or by free, etherified or esterified hydroxyl groups (such as those mentioned above), by phosphoriferous residues or by acyl radicals, such as the radicals of carboxylic acids, for example, residues of carbonic acid semi-esters or semi-amides or lower alkanoyl residues, or of sulphonic, such as arylsulphonic acid, for example, phenylsulphonyl residues, as well as nitrile groups or azidocarbonyl groups, as well as hydrazinocarbonyl or azocarbonyl groups which may be mono- or polysubstituted on the nitrogen, for example, by the above-mentioned substituents of the carbamyl group.

The present invention includes also any modification of the present process in which an intermediate obtained is used as starting material and any remaining step or steps is or are carried out with it. For example, saturated cyclic thioethers may be formed as intermediates and isolated or converted into each other, which contain in α-position a hydrazono group substituted by an esterified carboxyl group, or an acyloxy group together with an azo group substituted by an esterified carboxyl group; such intermediate compounds are, for example, 5-hydrazono-thiazolidines or 5-acyloxy-5-azo-thiazolidines, in which the hydrazono and the azo group are substituted by an esterified carboxyl group, especially 2,2-disubstituted 3-acyl-5-hydrazono-thiazolidine-4-carboxylic acids and 2,2-disubstituted 3-acyl-5-acyloxy-5-azo-thiazolidine-4-carboxylic acids, in which the hydrazono group and the azo group, respectively, are substituted by an esterified carboxyl group, and their functional derivatives, such as the compounds of the formulae

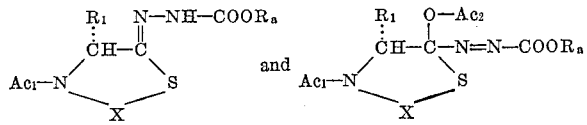

in which $Ac_1$, $Ac_2$, $R_1$ and X have the above meanings, and $R_a$ represents the residue of an alcohol, for example, the residue of one of the alcohols mentioned above as being suitable for esterifying the carboxyl groups $R_1$, especially the residue of an aliphatic alcohol, such as a lower alkanol or a substituted, preferably halogenated, lower alkanol. Such intermediates can be converted into the desired products by suitable measures either directly or stepwise. Thus, for example, a saturated cyclic thioether, which is substituted in α-position by a hydrazono group containing the esterified carboxyl group, can be converted into the desired acyloxy compound by additional treatment with an oxidation reagent capable of furnishing the acyloxy group. The desired acyloxy compound is also obtained when a saturated cyclic thioether, which contains in the α-position an acyloxy group together with an azo group with the esterified carboxy substituent, is treated, for example, with a hydrolyzing agent, especially a weakly acidic or weakly basic agent, such as potassium acetate in the presence of acetic acid or sodium hydrogen carbonate in the presence of methanol, or with water, preferably on a supporting substance, such as a diatomaceous earth preparation (Florisil). Furthermore, from a saturated cyclic thioether, which contains in the α-position an acyloxy group, together with an azo group having an esterified carboxy substituent, a saturated cyclic thioether substituted in the α-position by a hydrazono group containing the esterified carboxyl group can be formed, for example, by treatment with zinc and acetic acid.

The invention includes also any modification in which the process is discontinued at any stage thereof, or in which starting materials are used in the form of derivatives, for example of salts, or are formed during the reaction.

Preferred use is made of those starting materials and reaction conditions which give rise to the preferred compounds mentioned above.

The starting materials used in the above process can be prepared, for example, by the process described in patent application Ser. No. 573,816, filed Aug. 22, 1966 and now U.S. Pat. No. 3,449,336.

The compounds obtained according to the present invention can be converted into 7-amino-cephalosporanic acid and its derivatives as illustrated by the reaction scheme; this conversion may be carried out, for example, by the process described in the following patent applications:

Ser. No. 573,865, filed Aug. 22, 1966; Ser. No. 573,815, filed Aug. 22, 1966; Ser. No. 573,886, filed Aug. 22, 1966; Ser. No. 573,866, filed Aug. 22, 1966; and Ser. No. 573,876, filed Aug. 22, 1966.

The following examples illustrate this invention.

EXAMPLE 1

A solution of 1 g. of L-2,2-dimethyl-3-tertiary butyloxycarbonyl-5β-(N,N'-dicarbomethoxy - hydrazino) - thiazolidine-4-carboxylic acid N-methyl-N-phenylsulphonylamide in 50 ml. of absolute benzene is treated with 1.6 g. of vacuum-dried lead tetraacetate, and the mixture is stirred for 45 minutes under reflux. 0.05 ml. of distilled ethyleneglycol is added, and after 10 minutes the mixture is filtered with a filter aid (Hyflo) and rinsed with benzene. The yellow filtrate is evaporated to dryness and the crystalline residue triturated with ether and pentane, cooled and filered, to yield L-2,2-dimethyl-3-tertiary butyloxycarbonyl-5-acetyloxy - 5 - carbomethoxy-azo-thiazolidine-4-carboxylic acid N-methyl-N-phenylsulphonylamide of the formula

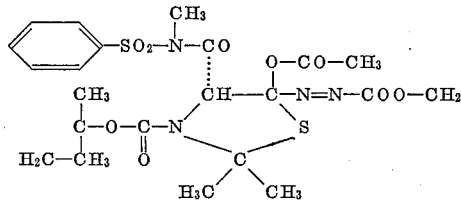

in almost colourless crystals which melt at 161–163° C. after recrystallization from methanol. Optical rotation $[\alpha]_D = -32° \pm 1°$ (c.=1.070 in chloroform). Infrared absorption bands (in methylenechloride) at 5.69, 5.90, 6.00, 7.35, 8.10, 8.34, 8.57 and 9.24μ. Ultraviolet absorption bands (in methylene chloride) $\lambda_{max}$ 225 mμ ($\epsilon$=13,000), 260 mμ ($\epsilon$=1500), 267 mμ ($\epsilon$=1770) and 274 mμ ($\epsilon$=1600) in ethanol, and $\lambda_{max}$ at about 380 mμ ($\epsilon$=about 70–80).

A solution of 0.663 g. of L-2,2-dimethyl-3 - tertiary butyloxycarbonyl-5-acetoxy-5 - carbomethoxyazo - thiazolidine-4-carboxylic acid N-methyl-N-phenylsulphonylamide in 100 ml. of benzene is mixed with 20 g. of a diatomaceous earth preparation (Florisil) and stirred for 45 minutes at room temperature; with evolution of gas the colour of the solution changes from deep yellow to light yellow to colourless. The mixture is then filtered, the residue washed with benzene and with 70 to 100 ml. of ethyl acetate, and the organic solutions are evaporated. The product is chromatographed on 35 g. of a diatomaceous earth preparation (Florisil). After preliminary washing with 150 ml. of benzene, the crude product is eluted with 350 ml. of benzene containing 1% of ethyl acetate. A mixture, which likewise consists predominantly of the desired product, is eluted with another 200 ml. of the same solvent mixture. The crude product is recrystallized from a mixture of ether and pentane, to yield semi-crystalline to amorphous L-2,2-dimethyl-3-tertiary butyloxycarbonyl- 5β-acetyloxythiazolidine-4-carboxylic acid N-methyl - N-phenylsulphonylamide of the formula

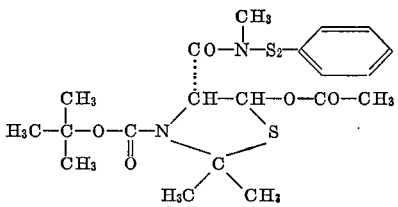

melting at 110–115° C. Optical rotation $[\alpha]_D = +72° \pm 1°$ (c.=0.922 in chloroform). Infrared absorption bands (in methylenechloride) at 5.74, 5.83, 7.36, 8.23, 8.60 and 10.38μ. Ultraviolet absorption bands (in ethanol) $\lambda_{max}$ 226 mμ ($\epsilon$=12,950), 260 mμ ($\epsilon$=1400), 267 mμ ($\epsilon$=1550) and 273 mμ ($\epsilon$=1250).

When the above chromatogram is further eluted with 150 ml. of benzene containing 2% of ethyl acetate, a mixture is obtained which consists predominantly of L-2,2-dimethyl-3-tertiary butyloxycarbonyl-5α - acetyloxythiazolidine-4-carboxylic acid N-methyl - N - phenylsulphonyl amide of the formula

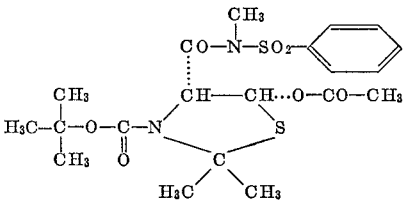

of which a further quantity is obtained with 100 ml. of benzene containing 2% of ethyl acetate and with 100 ml. of benzene containing 5% of ethyl acetate in a rather uniform state and with 50 ml. of benzene containing 5% of ethyl acetate and 100 ml. of benzene containing 10% of ethylacetate as a partially crystalline mixture together with the corresponding 5β-hydroxy and 5α-hydroxy compounds. After recrystallization from a mixture of methylenechloride and ether the product melts at 220–221° C. Optical rotation $[\alpha]_D = -214° \pm 1°$ (c.=0.889 in chloroform). Infrared absorption bands (in methylenechloride) at 5.75, 5.86, 5.97, 7.40, 8.25, 8.62 and 10.68μ.

The L-2,2-dimethyl-3 - tertiary butyloxycarbonyl - 5-acetyloxy-5-carbomethoxyazo-thiazolidine - 4 - carboxylic acid N-methyl-N-phenylsulphonylamide, which can also be converted into the desired product by treatment with a diatomaceous earth preparation (Florisil) in benzene for 17 hours at room temperature, followed by elution with ethyl acetate, is also obtained in the following manner:

A mixture of 0.02 g. of L-2,2-dimethyl-tertiary butyloxycarbonyl-5-N'-carbomethoxyhydrazono - thiazolidine-4-carboxylic acid N-methyl-N-phenylsulphonylamide and 1 ml. of benzene is stirred for 2 hours at room temperature with a solution of 0.016 g. of lead tetraacetate in 1 ml. of benzene. The excess of the oxidation reagent is decomposed by adding one drop of ethyleneglycol, and the reaction mixture is diluted with benzene and washed with water. The benzene solution furnishes L-2,2-dmethyl-3-tertiary-butyloxycarbonyl-5-acetoxy - 5 - carbomethoxyazo-thiazolidine-4-carboxylic acid N-methyl-N-phenylsulphonylamide which is identified by thin-layer chromatography and its infrared spectrum.

The L-2,2-dimethyl-tertiary butyloxycarbonyl-5-N'-carbomethoxyhydrazono-thiazolidine-4 - carboxylic acid N-methyl-N-phenylsulphonylamide used above can be prepared in the following manner:

A solution of 0.193 g. of crystalline L-2,2-dimethyl-3-tertiary butyloxycarbonyl-5-acetoxy-5 - carbomethoxyazo-thiazolidine-4-carboxylic acid N-methyl - N - phenylsulphonylamide in 10 ml. of acetic acid and 0.1 ml. of water is mixed with 2 g. of zinc powder and the mixture is stirred for 1 hour at room temperature, and filtered; the residue is cautiously washed with benzene, the filtrate diluted to a volume of about 120 ml. with benzene and repeatedly washed with water, the washing being washed back with benzene. The combined benzene extracts are evaporated and the residue chromatographed on 10 g. of a diatomaceous earth preparation (Florisil). Benzene, benzene containing 2% of ethyl acetate, and 40 ml. of benzene containing 5% of ethyl acetate, elute mixtures of L-2,2-dimethyl-3-tertiary butyloxycarbonyl-5β-acetyloxythiazolidine-4-carboxylic acid N-methyl-N-phenylsulphonamide with the corresponding 5α-acetyloxy compound. A further quantity of 40 ml. of benzene containing 5% of ethyl acetate, and 60 ml. of benzene containing 10% of ethyl acetate, elute 2,2-dimethyl-tertiary butyloxycarbonyl-5-N'-carbomethoxyhydrazono - thiazolidine - 4-carboxylic acid N-methyl-N-phenylsulphonylamide of the formula

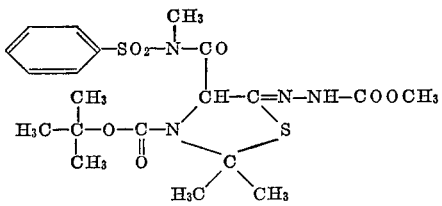

which, after crystallization from ether, melts at 163–165° C. Optical rotation [α]_D=0°±1° (c.=1.015 in chloroform). Infrared absorption bands (in methylenechloride) at 2.99, 5.70, 5.82. 5.93 (shoulder), 6.20, 6.67, 7.40, 8.17, 8.55 and 9.35μ.

EXAMPLE 2

A mixture of 3 ml. of glacial acetic acid and 0.15 g. of anhydrous sodium acetate is stirred for 35 minutes at 80° C., then 0.05 g. of L-2,2-dimethyl-3-tertiary butyloxycarbonyl-5-acetoxy-5-carbomethoxyazo - thiazolidine-4-carboxylic acid N-methyl-N-phenylsulphonylamide is added and the whole is stirred for another 45 minutes at 80° C.; after 30 minutes the initially yellow mass loses its colour. The reaction product is isolated by pouring the batch into water, and extraction with benzene yields a crystalline mixture of L-2,2-dimethyl-3-tertiary butyloxycarbonyl-5β-acetyloxy-thiazolidine-4-carboxylic acid N-methyl-N-phenylsulphonylamide and the corresponding 5α-acetyl product.

Alternatively, the reaction may be carried out by treating the starting material with triethyl ammonium acetate in hot benzene for 17 hours.

EXAMPLE 3

A solution of 0.388 g. of L-2,2-dimethyl-3-tertiary butyloxycarbonyl - 5 - acetoxy - 5 - carbomethoxyazo-thiazolidine-4-carboxylic acid N - methyl-N-phenylsulphonylamide in 10 ml. of methylene chloride and 10 ml. of methanol is mixed with 0.15 g. of anhydrous sodium carbonate and then stirred for 30 minutes at room temperature. Gas is evolved and the yellow colour of the solution disappears. The solution is diluted with methylene chloride, washed with water, dried and evaporated to yield a crystalline mixture of L-2,2-dimethyl-3-tertiary butyloxy-carbonyl-5β-acetyloxy - thiazolidine-4-carboxylic acid N-methyl-N-phenylsulphonylamide and of the corresponding 5α-acetyloxy product.

EXAMPLE 4

A solution of 0.92 g. of L-2,2-dimethyl-3-tertiary butyloxycarbonyl-5β-(N,N' - dicarbethoxy - hydrazino)-thiazolidine-4-carboxylic acid methyl ester in 16 ml. of acetonitrile is treated with 0.34 g. of anhydrous sodium acetate and 1.4 g. of lead tetraacetate free from acetic acid. The mixture is heated for 45 minutes at 60° C., then evaporated under vacuum and the residue is triturated 3 times with 20 ml. of hexane and with 5 ml. of methylene chloride. The combined filtrates are concentrated under reduced pressure to yield a yellow oil which is again dissolved in 6 ml. of acetonitrile and treated with 1.45 g. of lead tetraacetate. The reaction mixture is heated for 1 hour at 60° C., the lead diacetate formed is filtered off, the filtrate is evaporated and the residue is taken up in 5 ml. of methylene chloride and 30 ml. of hexane. After a few minutes the extract is filtered, the filtrate once more evaporated under vacuum and the yellow oily product is chromatographed on 42 g. of anhydrous silica gel. The column is pre-eluted with 350 ml. of benzene, then with 100 ml. of benzene containing 5% of ethylene acetate. The next three fractions eluted with 50 ml. each of this solvent mixture contain the desired L-2,2-dimethyl-3-tertiary butyloxycarbonyl - 5β - acetyloxy-thiazolidine-4-carboxylic acid methyl ester of the formula

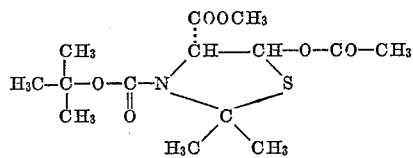

which is obtained in crystalline form when in the product obtained from the second of these three fractions the deposited crystals are freed from the oily material by being washed with pentane and then used for seeding the first and the third fractions. The crystalline product is recrystallized from hexane and for analytical purposes sublimed at 115° C. under an oil pump pressure; it melts at 150–151° C. Optical rotation [α]_D=+203°±2° (c.=0.41 in chloroform). Infrared absorption bands (in methylene chloride) at 5.72, 5.90, 7.35, 8.23, 8.55, 9.32, 9.90 and 10.35μ.

A further quantity of the desired compound can be identified in the above crude product, but it is not isolated and is further worked up without previous purification.

EXAMPLE 5

2.9 grams of lead tetraacetate are given at once into a solution of 1.265 g. of L-2,2-dimethyl-3-tertiary butyloxycarbonyl-5β-(N,N'-dicarbomethoxy - hydrozino)-thiazolidine-4-carboxylic acid methyl ester in 90 ml. of dry benzene containing 0.3 ml. of glacial acetic acid, and the mixture is refluxed. When the solid reagent has dissolved, a precipitate of lead diacetate begins to form and about 2 hours later no oxidation reagent can be detected any longer. The reaction mixture is filtered with the use of a filter aid (Celite), rinsed with benzene and the yellow filtrate is evaporated, repeatedly taken up in a mixture of benzene and heptane, and each time the solvent mixture is evaporated until the acetic acid has been completely removed.

The golden yellow, viscous-oily residue, containing L-2,2-dimethyl-3-tertiary butyloxycarbonyl-5-acetyloxy-5-carbomethoxyazo-thiazolidine-4-carboxylic acid methyl ester of the formula

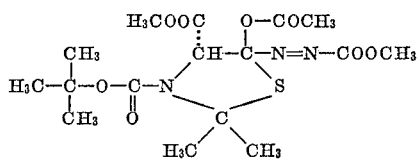

is chromatographed within 3 hours on 39 g. of a diatomaceous earth preparation (Florisil). Elution with benzene, ether and a mixture of ether and methanol furnishes a crude product consisting predominantly of L-2,2-dimethyl-3-tertiary butyloxycarbonyl-5β-acetyloxy-thiazolidine-4-carboxylic acid methyl ester which melts at 145 to 148° C. after recrystallization from a mixture of ether, methylene chloride and hexane.

The subsequently eluted fractions and the mother liquor are combined, hydrolyzed with sodium acetate in methanol, and chromatographed on 60 times the amount of silica-gel containing 5% of water. After washing with benzene containing 3% of ethyl acetate the L-2,2-dimethyl-3-tertiary butyloxycarbonyl-5β-hydroxy - thiazolidine-4-carboxylic acid methyl ester of the formula

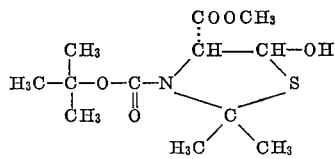

is eluted with benzene containing 5% and 10% of ethyl acetate. The product can be reconverted into the L-2,2-dimethyl-3-tertiary butyloxycarbonyl - 5β - acetyloxy-thiazolidine-4-carboxylic acid methyl ester by treatment with acetic anhydride for 12 hours at 100° C. Optical rotation $[α]_D = +205° ± 1°$ (c.=0.5 in chloroform) melting at 150.5° C. after having been chromatographed within one hour on 50 times its weight of silica gel.

EXAMPLE 6

A mixture of 1.07 g. of L-2,2-dimethyl-3-tertiary butyloxycarbonyl - 5β - (N,N'-dicarbomethoxy-hydrazino)-thiazolidine-4-carboxylic acid 2,2,2-trichloroethyl ester in 50 ml. of benzene containing 0.25 ml. of glacial acetic acid and 1.75 g. of lead tetraacetate is refluxed for 45 minutes. The cooled mixture is filtered, the solvent evaporated under vacuum and the residue taken up in 200 ml. of a 1:1-mixture of benzene and heptane. The solvents are then evaporated and the residue chromatographed on 20 g. of a diatomaceous earth preparation (Florisil). The oily L-2,2 - dimethyl-3-tertiary butyloxycarbonyl-5β - acetyloxy-thiazolidine-4-carboxylic acid 2,2,2-trichloroethyl ester of the formula

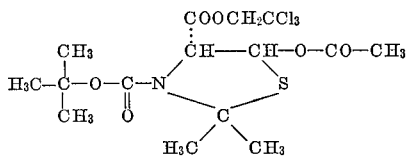

is eluted with benzene. Optical rotation $[α]_D = +49° ± 1°$ (c.=1.04 in chloroform). Infrared absorption bands (in methylenechloride) at 5.74, 5.90 and 8.25μ.

EXAMPLE 7

A solution of 0.14 g. of L-2,2-dimethyl-3-tertiary butyloxycarbonyl - 5β-acetyloxy-thiazolidine-4-carboxylic acid 2,2,2-trichloroethyl ester in 3.5 ml. of 90% acetic acid is mixed with 1.5 g. of zinc dust, and the reaction mixture is stirred for 4 hours at room temperature. The batch is filtered and the residue rinsed with 4 ml. of acetic acid and 200 ml. of benzene; the filtrate is washed 5 times with water, dried over magnesium sulphate and evaporated. The residue crystallizes on being triturated with a mixture of pentane and ether and is recrystallized from a mixture of ether and hexane. The resulting L-2,2-dimethyl - 3-tertiary butyloxycarbonyl-5β-acetoxy-thiazolidine-4-carboxylic acid of the formula

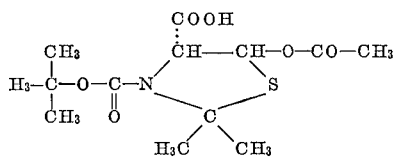

melts at 145–146° C. after having been sublimed at 127° C. under a pressure of 0.001 mm. Hg. Optical rotation $[α]_D^{20} = +225°$ (c.=0.93 in chloroform). Infrared absorption bands (in methylenechloride) at 5.75, 5.90 and 8.25μ.

EXAMPLE 8

A solution of 25.23 g. of L-2,2-dimethyl-3-tertiary butyloxycarbonyl - 5β - (N,N'-dicarbomethoxy-hydrazino)-thiazolidine-4-carboxylic acid 2,2,2-trichloroethyl ester in 300 ml. of benzene is mixed with 49 g. of lead tetraacetate and the mixture is kept for 45 minutes at a gentle boil. After cooling and filtering the filtrate is evaporated in a water-jet vacuum and the residue chromatographed on 750 g. of a diatomaceous earth preparation (Florisil). The crude mixture of L-2,2-dimethyl-3-tertiary butyloxycarbonyl-5α-acetyloxy-thiazolidine-4-carboxylic acid 2,2,2-trichloroethyl ester and its 5β-acetoxy isomer is eluted with 2500 ml. of a 98:2-mixture of benzene and ethyl acetate. On crystallization from pentane there is obtained the L-2,2-dimethyl-3-tertiary butyloxycarbonyl-5β-acetyloxy-thiazolidine-4-carboxylic acid 2,2,2-trichloroethyl ester melting at 87° C.

The mother liquor furnishes the non - crystallizing L-2,2-dimethyl-3-tertiary butyloxycarbonyl - 5α - acetyloxy-thiazolidine-4-carboxylic acid 2,2,2-trichloroethyl ester of the formula

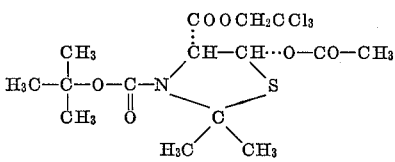

EXAMPLE 9

A mixture of 11.82 g. of L-2,2-dimethyl-3-tertiary butyloxycarbonyl - 5β - (N,N'-dicarbomethoxy-hydrazino)-thiazolidine-4-carboxylic acid 2,2,2-trichloroethyl ester in 150 ml. of benzene and 24.4 g. of lead tetraacetate is heated for 45 minutes at a gentle boil, cooled, filtered and evaporated under vacuum. The yellow, oily residue contains the L-2,2-dimethyl-3-tertiary butyloxycarbonyl-5-acetyloxy-5-carbomethoxyazo - thiazolidine - 4-carboxylic acid 2,2,2-trichloroethyl ester; it is taken up in 200 ml. of warm hexane, filtered, and the filtrate is evaporated. The residue is dissolved in 250 ml. of benzene, mixed with 100 g. of a diatomaceous earth preparation (Florisil) and 5 ml. of ethyl acetate and stirred for 80 minutes. The batch is filtered and the filtrate evaporated, to yield a crude mixture of L-2,2-dimethyl-3-tertiary butyloxycarbonyl-5α-acetyloxy-thiazolidine-4-carboxylic acid 2,2,2-trichloroethyl ester and its 5β-acetyloxy isomer.

EXAMPLE 10

A solution of the mixture obtained by the process described in Example 9 in 200 ml. of glacial acetic acid and 20 ml. of water is mixed with 60 g. of zinc dust and stirred for 3 hours at room temperature. The mixture is then filtered and the filter residue washed with 60 ml. each of glacial acetic acid and benzene. The filtrate is evaporated under 0.5 mm. Hg, the residue taken up in 600 ml. of ether and the solution washed with 600 ml. of water, and the aqueous phase is rinsed with ether. The combined ether solutions are twice washed with water, dried and evaporated, and the residue dissolved in ether, treated with an active carbon preparation and crystallized from a mixture of ether and pentane, to yield L-2,2-dimethyl - 3-tertiary butyloxycarbonyl-5β-acetyloxy-thiazolidine-4-carboxylic acid melting at 146–147° C.

The mother liquor is evaporated and the residue dissolved in methylene chloride and extracted with an aqueous sodium hydrogen carbonate solution. The basic extract is acidified with citric acid and extracted with methylene chloride. Fractional crystallization from a mixture of pentane and ether furnishes the L-2,2-dimethyl-3-tertiary butyloxycarbonyl - 5α - acetyloxy-thiazolidine-4-carboxylic acid of the formula

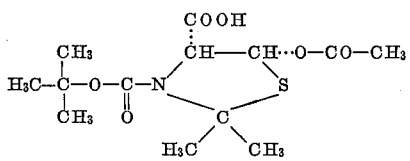

M.P. 171–171.5° C.; $[α]_D^{20} = -346° ± 1°$ (c.=0.925 in chloroform); infrared absorption spectrum (in methylenechloride) with bands at 2.87, 3.15, 5.75, 5.90, 5.96, 7.25, 7.53, 8.25, 8.63 and 10.66μ; together with a major quantity of a crystalline mixture of the two acids.

EXAMPLE 11

A mixture of 0.25 g. of L-2,2-dimethyl-3-tertiary butyloxycarbonyl - 5β - (N,N' - dicarbethoxy-hydrazino)-thiazolidine-4-carboxylic acid N-acetylamide in 10 ml. of boiling benzene is treated with 0.45 g. of lead tetraacetate and refluxed for 60 minutes. The reaction mixture is then concentrated under a water-jet vacuum to about 5 ml., diluted with 25 ml. of hexane and filtered. The filtrate is concentrated under vacuum and the yellow oily residue chromatographed on silica gel. The L-2,2-dimethyl-3 - tertiary butyloxycarbonyl - 5 - acetyl-5-carbethoxyazo-thiazolidine - 4 - carboxylic acid N-acetylamide of the formula

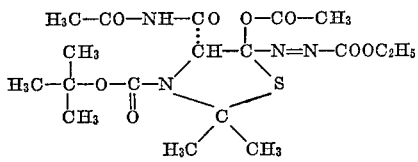

is eluted with a 9:1-mixture of benzene and ethyl acetate. Treatment of the eluate with a diatomaceous earth preparation (Florisil) furnishes a mixture of L-2,2-dimethyl-3 - tertiary butyloxycarbonyl - 5β - acetyloxy-thiazolidine-4-carboxylic acid N-acetylamide of the formula

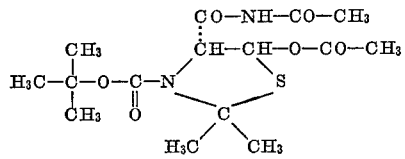

and its 5α-acetyloxy isomer.

EXAMPLE 12

A solution of 0.831 g. of L-2,2-dimethyl-3-tertiary butyloxycarbonyl - 5β-acetyloxy-thiazolidine-4-carboxylic acid in 10 ml. of methylene chloride is mixed with 0.36 ml. of triethylamine, cooled to −10° C. and treated with 0.25 ml. of chloroformic acid ethyl ester in 4 ml. of cold methylene chloride. The reaction mixture is kept for 90 minutes at −10° to −5° C. under anhydrous conditions and then treated for 3 hours with a strong current of dry gaseous ammonia. The batch is kept for 10 minutes at 0° C. and for 40 minutes at room temperature and then filtered, the filter residue rinsed with methylene chloride and the filtrate evaporated. The residue is dissolved in 30 ml. of methylene chloride, and the solution is agitated with 5 g. of silica gel containing 5% of water and filtered. The silica gel is rinsed with 9:1-mixtures and 5:1-mixtures of methylene chloride and alkyl acetate, to yield L-2,2-dimethyl - 3 - tertiary butyloxy-carbonyl-5β-acetyloxy-thiazolidine-4-carboxylic acid amide of the formula

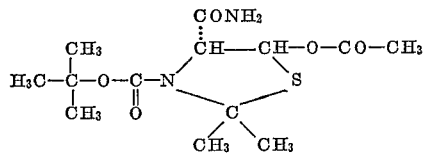

as a colourless glass which can be distilled at 125° C.–130° C. under 0.001 mm. Hg pressure as a viscide, colourless oil. Infrared absorption bands (in methylene chloride) at 2.86, 2.96, 5.75, 5.92, 6.38, 7.25, 8.25, 7.42, 8.25, 8.65, 9.2, 9.35, 9.88 and 10.40μ.

EXAMPLE 13

980 grams of lead tetraacetate are tipped into a solution of 384 g. of L-2,2-dimethyl-3-tertiary butyloxycarbonyl-5 - (N,N'-dicarbomethoxy-hydrazino)-thiazolidine-4-carboxylic acid methyl ester. The solution turns dark brown and is heated, whereupon it becomes golden yellow and white lead diacetate begins to separate. The batch is stirred for 2 hours under reflux and 0.5 ml. of ethyleneglycol is added; the reaction mixture is filtered through a glass filter and the residue washed with a total of 4000 to 5000 ml. of dry benzene. The combined filtrates are evaporated under vacuum and the yellow, oily residue is taken up in 3× 500 ml. of dry benzene and the solvent is evaporated under vacuum each time. The slowly crystallizing residue is taken up in methylene chloride, the solution filtered and evaporated. The reaction product, consisting predominantly of a mixture of L-2,2-dimethyl-3-tertiary butyloxycarbonyl - 5α - acetyloxy-thiazolidine-4-carboxylic acid methyl ester and its 5β-acetyloxy isomer, as well as of 2,2-dimethyl-3-tertiary butyloxycarbonyl-4-thiazoline-4-carboxylic acid methyl ester and L-2,2-dimethyl-3 - tertiary butyloxycarbonyl-5-acetyloxy-5-carbomethoxyazo-triazolidine-4-carboxylic acid methyl ester, is further processed without further purification.

A solution of 363 g. of the product in 8000 ml. of dry methanol is mixed with 150 g. of sodium acetate and the mixture is refluxed with stirring for 24 hours and then cautiously evaporated under vacuum. The residue is stirred with 2× 1500 ml. of benzene and each time evaporated to dryness, and then thoroughly extracted within 6 hours with a total volume of 5000 ml. of methylene chloride. The organic solution is evaporated and the resulting dark brown oil dissolved in 1000 ml. of dry benzene and chromatographed on 1900 g. of silica gel containing 5% of water, in each case collecting fractions of 2000 ml., 16,000 to 18,000 ml. of benzene, containing 3% of ethyl acetate elute in the first place apolar by-products; subsequent elution with 40,000 ml. of benzene containing 5% of ethyl acetate and 8000 ml. of benzene containing 10% of ethyl acetate furnishes the L-2,2-dimethyl-3-tertiary butyloxycarbonyl - 5β - hydroxy-thiazolidine-4-carboxylic acid methyl ester of the formula

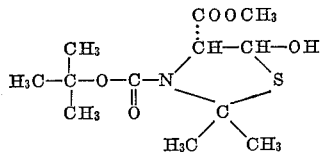

in the form of a yellow oil which crystallizes from hexane containing a trace of ether as an almost white product melting at 101–102° C. (after drying for 3 hours at 90° C., under 0.01 mm. Hg pressure). Optical rotation $[\alpha]_D = +48° \pm 1°$ (c.=1.14 in chloroform). Infrared absorption bands (in methylene chloride) at 2.80, 5.75, 5.95, 7.35, 8.65 and 9.35μ; end absorption in the ultraviolet spectrum (in 95% methanol). The resulting mother liquor is once more chromatographed on silica gel to yield a further amount of the desired product.

Eluted as polar by-products are in the first place the 2,2-dimethyl-3-tertiary butyloxycarbonyl - 4-thiazoline-4-carboxylic acid methyl ester boiling at 65° C. under 0.001 mm. Hg pressure and melting at 34–36.5° C.; infrared absorption bands (in methylene chloride) at 5.88, 6.37, 7.34, 7.45, 7.62, 8.24, 8.65, 8.85, 9.32 and 11.91μ; ultraviolet absorption bands (in ethanol) $\lambda_{max}$ 270 mμ ($\epsilon$=5320) and 316 mμ ($\epsilon$=5960), and the L-2,2-dimethyl-3-tertiary butyloxycarbonyl-4-hydroxy-thiazolidine-5-one-4-carboxylic acid methyl ester melting at 113.5–114° C. Optical rotation $[\alpha]_D = -1° \pm 1°$ (in chloroform). Infrared absorption bands (in methylene-chloride) at 2.85, 5.70, 5.85, 7.60, 8.95, 10.25 and 10.45μ. Ultraviolet absorption bands (in 96% ethanol) $\lambda_{max} = 237$ mμ

($\epsilon$=4350)

EXAMPLE 14

A solution of 0.084 g. of L-2,2-dimethyl-3-tertiary butyloxycarbonyl-5α - acetyloxy - thiazolidine-4-carboxylic acid in 0.56 ml. of 1 N sodium hydroxide solution is kept for 2 hours at room temperature, then mixed with 0.13 g. of citric acid and repeatedly extracted with methylene-chloride. The organic extracts are evaporated to yield L-2,2-dimethyl-3-tertiary butyloxycarbonyl - 5β-hydroxy-thiazolidine-4-carboxylic acid of the formula

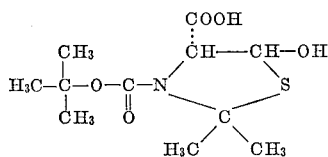

which melts at 185° C. on recrystallization from a mixture of ether and pentane. Optical rotation $[\alpha]_D^{20} = +127°$ ±1° (c.=0.8 in 1 N sodium hydroxide solution). Infrared absorption bands (in potassium bromide) at 2.82, 5.75, 6.02, 7.25, 8.02, 8.40, 8.65, 9.20, 9.70, 10.89, 11.65, 12.90 and 13.30μ.

EXAMPLE 15

A solution of 2.05 g. of L-2,2-dimethyl-3-tertiary butyloxycarbonyl-5β - acetyloxy - thiazolidine-4-carboxylic acid in 13 ml. of 1 N sodium hydroxide solution is kept for 2¼ hours at room temperature, then mixed with 2 g. of citric acid and repeatedly extracted with methylene chloride. The dried organic extracts are evaporated and the residue crystallized from a mixture of acetone and hexane, to yield L-2,2-dimethyl-3-tertiary butyloxycarbonyl-5β-hydroxy-thiazolidine-4-carboxylic acid of the formula

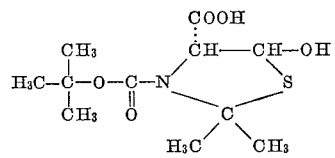

melting at 185° C. Optical rotation $[\alpha]_D^{20} = +123° ±1°$ (c.=1 in 1 N sodium hydroxide solution).

EXAMPLE 16

0.035 gram of L-2,2-dimethyl-3-tertiary butyloxycarbonyl-5β-hydroxy-thiazolidine-4-carboxylic acid in 2 ml. of ether is treated with an ether solution of diazomethane, and the crude product is dissolved in a 9:1-mixture of benzene and ethyl acetate and filtered through 1.2 g. of silica gel, to yield pure L-2,2-dimethyl-3-tertiary butyloxycarbonyl-5β-hydroxy-thiazolidine-4-carboxylic acid methyl ester which is identical with the product obtained by the process of Example 13.

EXAMPLE 17

A solution of 0.323 g. of L-2,2-dimethyl-3-tertiary butyloxycarbonyl - 5β - acetyloxy-thiazolidine-4-carboxylic acid amide in 2 ml. of methanol is mixed with 1 ml. of 1 N sodium hydroxide solution, then kept for 160 minutes at room temperature, evaporated to half its volume under vacuum and extracted with methylene chloride. The resulting crude product obtained on evaporation consists predominantly of L-2,2-dimethyl-3-tertiary butyloxycarbonyl-5β-hydroxy - thiazolidine-4-carboxylic acid amide of the formula

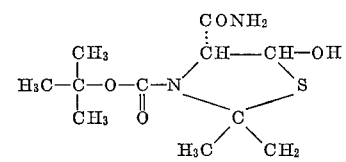

whose infrared spectrum (in methylene chloride) contains bands at 2.80, 2.87, 2.95, 5.95, 6.40, 7.25, 7.35, 7.45, 8.65, 9.20, 9.35, 9.83 and 11.66μ.

EXAMPLE 18

A mixture of 6.24 g. of L-2,2-dimethyl-3-tertiary butyloxycarbonyl-5-(N,N' - dicarbomethoxy - hydrazino)-thiazolidine-4-carboxylic acid 2,2,2-trichloroethyl ester and 60 ml. of benzene is treated with 10.33 g. of lead tetraacetate and refluxed for 30 minutes. After cooling and filtering, the filtrate is evaporated under vacuum, to yield a yellow, oily residue consisting predominantly of a mixture of L-2,2-dimethyl-3-tertiary butyloxycarbonyl - 5α-acetyloxy-thiazolidine-4-carboxylic acid 2,2,2-trichloroethyl ester and its 5β-acetyloxy isomer, as well as the L-2,2-dimethyl - 3 - tertiary butyloxycarbonyl-5-acetyloxy-5-carbomethoxyazo-thiazolidine-4-carboxylic acid 2,2,2-trichloroethyl ester; this mixture is further worked up without being further purified.

By chromatography of the resulting product mixture on 180 g. of a diatomaceous earth preparation (Florisil) and elution with 1000 ml. of a 98:2-mixture of benzene and ethyl acetate there is obtained as the main product L-2,2-dimethyl-3-tertiary butyloxycarbonyl-5β-acetoxy-thiazolidine-4-carboxylic acid 2,2,2-trichloroethyl ester, whereas subsequent fractions eluted with the same solvent mixture furnish L-2,2-dimethyl-3-tertiary butyloxycarbonyl-5β-hydroxy-thiazolidine-4-carboxylic acid 2,2,2-trichloroethyl ester of the formula

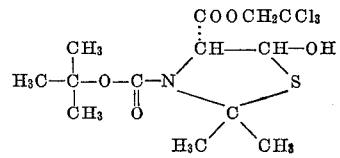

as a colourless oil boiling at 115° C. under 0.005 mm. Hg pressure. Infrared absorption bands (in methylene chloride) at 2.75, 5.65, 5.72, 5.85, 5.90, 7.35, 8.60, 9.16, 9.32, 9.78 and 11.6μ.

EXAMPLE 19

A solution of 0.274 g. of crude L-2,2-dimethyl-3-tertiary butyloxycarbonyl - 5α-acetyloxy-thiazolidine-4-carboxylic acid N-methyl-N-phenylsulphonylamide in 3 ml. of dimethylformamide is mixed with 0.05 ml. of anhydrous hydrazine and the mixture is stirred for 5 hours at room temperature, then poured into 30 ml. of saturated sodium chloride solution and extracted three times with 90 ml. of methylene chloride in 3 portions. The organic extract is once washed with saturated sodium chloride solution and evaporated. The crude product is dissolved in 40 ml. of methylene chloride and washed with 2× 30 ml. of 10% aqueous citric acid solution and once with 30 ml. of water. The acid extracts are adjusted with aqueous ammonia to pH about 9 and extracted with 3 × 40 ml. of methylene chloride. The organic extracts are evaporated and the crystalline residue is recrystallized from a mixture of ether and pentane, to yield L-2,2-dimethyl-3-tertiary butyloxycarbonyl-5β-hydroxy-thiazolidine-4-carboxylic acid hydrazine of the formula

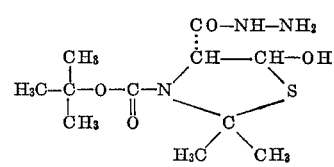

which after recrystallization melts at 154–155° C. Optical rotation $[\alpha]_D^{20} = +16±1°$ (c.=1.119 in chloroform). Infra-red absorption bands (in methylene cholride) at 2.78, 2.92, 3.03, 6.00, 6.19, 7.25, 7.36, 7.50 and 8.14μ.

EXAMPLE 20

By treating a benzene solution of L-2,2-dimethyl-3-tertiary butyloxycarbonyl - 5-acetyloxy-5-carbomethoxy-azothiazolidine - 4-carboxylic acid N-methyl-N-phenyl-sulphonylamide with a diatomaceous earth preparation (Florisil), there is obtained, in addition to a mixture of the 5α-acetylloxy and 5β-acetyloxy isomers of L-2,2-dimethyl - 3-tertiary butyloxycarbonyl-5-acetyloxy-thiazolidine - 4-carboxylic acid N-methyl-N-phenylsulphonyl-amide, also the L-2,2-dimethyl-3-tertiary butyloxycarbonyl - 5β - hydroxy - thiazolidine-4-carboxylic acid N-methyl-N-phenylsulphonylamide of the formula

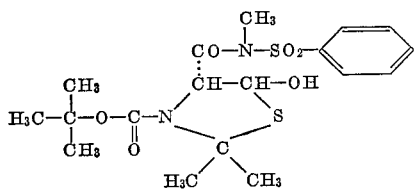

melting at 177 to 181° C. Infrared absorption bands (in methylene chloride) at 2.80, 2.99, 3.44, 5.90, 5.98, 7.42, 8.30, 8.62, 9.20, 9.38, 9.82, 9.94 and 10.78μ.

EXAMPLE 21

A solution of 0.322 g. of diphenyldiazomethane in 5 ml. ether is added dropwise over a period of 10 minutes and while stirring to a solution of 0.456 g. of L-2,2-dimethyl - 3 - tertiary butyloxycarbonyl-5β-hydroxy-thiazolidin-4-carboxylic acid in 7 ml. of ether. The reaction mixture is allowed to stand over night, then filtered and the filtrate is evaporated under reduced pressure. The resulting yellowish syrup is chromatographed on 39 g. of silica gel; the column is prepared with benzene and 50 ml. fractions are taken, a 19:1-mixture of benzene and ethyl acetate being used for the elution. Fractions 4–8 are evaporated and combined and the product dried over night at 50° C./0.01 mm. Hg to yield the glass-like yellowish L-2,2-dimethyl-3-tertiary butyloxycarbonyl-5β-hydroxy - thiazolidine-4-carboxylic acid diphenylmethyl-ester of the formula

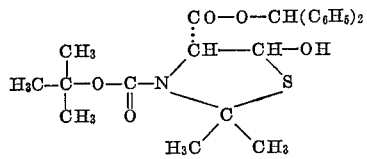

which in the infrared spectrum (in methylene chloride) shows bands at 2.75, 3.45, 5.72, 5.90 and 7.35μ.

EXAMPLE 22

A solution of 0.104 g. of L-2,2-dimethyl-3-tertiary butyloxycarbonyl - 3-tertiary butyloxycarbonyl-5β-acetyloxy - thiazolidin - 4 - carboxylic acid-N-phenylsulfonyl-amide in 2 ml. of dioxan is diluted with 2 ml. of water, cooled with ice and, while stirring, quickly treated with 4.54 ml. of an 0.1 N sodium hydroxide solution. The solution is stirred at 0° C. during 10 minutes, diluted with 50 ml. of methylene chloride and washed with 10 ml. of a 10% aqueous citric acid solution and with 50 ml. of water, dried and evaporated. The residue is crystallized from a mixture of ether and pentane to yield the L - 2,2-dimethyl-3-tertiary butyloxy-carbonyl-5β-hydroxy-thiazolidin-4-carboxylic acid-N-phenyl-sulfonylamide of the formula

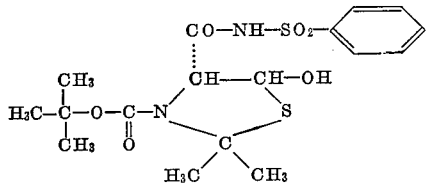

which melts at 164–165° C. after recrystallization from methylene chloride and hexane; [α]$_D^{20}$=−26°±1° (c.=1.62 in chloroform); infrared absorption spectrum (in methylene chloride) with bands at 2.75, 3.00, 5.85 and 6.07μ.

The starting material is prepared by reacting L-2,2-dimethyl-3-tertiary butyloxycarbonyl-5β-acetyloxythiazolidine-4-carboxylic acid (Example 7) with phenyl sulfonyl-isocyanate in the presence of triethylamine and dry benzene as the solvent. The L-2,2-dimethyl-3-tertiary butyl-oxycarbonyl-5β-acetyloxy-thiazolidine-4-carboxylic acid-N-phenylsulfonylamide of the formula

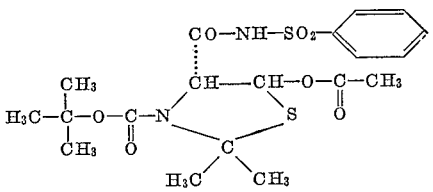

melts at 150–152° C. after recrystallization from a mixture of methylenechloride, ether and pentane; [α]$_D^{20}$=+57°±1° (c.=1.032 in chloroform); infrared absorption spectrum (in methylene chloride) with bands at 3.0, 5.73, 5.83, 5.95, 6.07, 7.06, 7.25, 7.34, 8.20, 8.43, 8.50, 9.20, 9.85 and 10.36μ; ultraviolet absorption spectrum (in ethanol) with λ$_{max}$ at 223 mμ (ε=23,000), 260 mμ (ε=810), 267 mμ (ε=1100) and 273 mμ (ε=920).

EXAMPLE 23

A solution of 5 g. of L-2,2-dimethyl-3-tertiary butyl-oxycarbonyl-5β-acetyloxy-thiazolidine-4-carboxylic acid methyl ester in 150 ml of a 1:1-mixture of tetrahydrofuran and methanol is cooled to −15° C. and slowly treated with 30 ml. of a 0.5 N aqueous sodium hydroxide solution; the addition takes about 1 hour. After acidifying the reaction mixture with 2 ml. of acetic acid (pH about 6) and evaporating it under reduced pressure to a volume of about 50 ml.; a total of 200 ml. of water is slowly added while stirring. As soon as an oily precipitate is formed, the reaction mixture is seeded with a small amount of L-2,2-dimethyl-3-tertiary butyloxycarbonyl-5β-hydroxy-thiazolidine-4-carboxylic acid methyl ester and cooled, while continuing the addition of the water. After stirring for 1 hour at 0°, the mixture is filtered; the solid material is dried over calcium chloride under reduced pressure and at room temperature. The resulting crude L-2,2-dimethyl-3 - tertiary butyloxycarbonyl - 5β - hydroxythiazolidine-4-carboxylic acid methyl ester melts at 98–99° and may be used without further purification. By extracting the filtrate twice with 100 ml. of methylene chloride one obtains a further amount of the desired hydroxy ester in crude form.

It can also be purified as follows: A mixture of 21.4 g. of the crude L-2,2-dimethyl-3-tertiary butyloxycarbonyl-5β-hydroxy-thiazolidine-4-carboxylic acid methyl ester and 150 ml. of ether is concentrated to 80 ml., diluted with 160 ml. of hexane and concentrated under normal pressure to 100 ml. After seeding the temperature is slowly brought to room temperature and the mixture is allowed to stand at −10° over night. The precipitate is filtered off to yield the L-2,2-dimethyl-3-tertiary butyloxycarbonyl-5β-hydroxythiazolidine-4-carboxylic acid methyl ester melting at 100–103°.

EXAMPLE 24

A solution of 1.145 g. of L-2,2-dimethyl-3-tertiary butyloxycarbonyl - 5β - hydroxy-thiazolidine-4-carboxylic acid methyl ester in 30 ml. of ethanol-free methylene chloride is treated with 30 ml. of triethylamine and then during 2 minutes with phosgene. The mixture starts to boil and triethylammonium chloride precipitates; it is immediately concentrated under reduced pressure to about 5 g. to a half-crystalline residue which is extracted several times with warm ether. After filtering, the organic solvent is concentrated under water pump vacuum and the oily residue, containing the L-2,2-dimethyl-3-tertiary butyloxycarbonyl-5-chloro-thiazolidine-4-carboxylic acid methyl ester of the formula

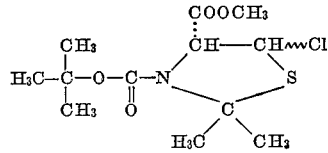

is dissolved without further purification in 20 ml. of acetic acid and stirred with 2 g. of sodium acetate. The clear solution is becoming turbid (precipitation of sodium chloride) and after 2 hours, the dispersion is evaporated under reduced pressure; at the end a small amount of toluene is added, and also evaporated. The residue is taken up in 50 ml. of water and 50 ml. of methylene chloride, the organic phase is washed twice with 50 ml. of water, dried and evaporated under reduced pressure. The oily residue crystallizes and is taken up in 5 ml. of a 1:1-mixture of hexane and pentane. The crystalline product is filtered off and represents the L-2,2-dimethyl-3-tertiary butyloxycarbonyl - 5β-acetyloxy-thiazolidine-4-carboxylic avid methyl ester, which melts at 145–148° after washing with pentane.

The hexane-pentane-solution is evaporated and the oily residue is chromatographed on 50 g. of silica gel, the column being prepared with benzene:

| Fraction | Solvent | Ml. | Weight (in g.) |
|---|---|---|---|
| 1 | Benzene | 100 | 0.001 |
| 2 | Benzene containing 5% ethyl acetate | 100 | 0.001 |
| 3 | do | 100 | ¹0.265 |
| 4 | do | 50 | ¹0.127 |
| 5 | do | 52 | ¹0.139 |
| 6 | do | 50 | ¹0.072 |
| 7 | do | 50 | ¹0.018 |
| 8 | do | 50 | ¹0.008 |

¹ Oil.

Fractions 5–8 are taken together and distilled: the desired L-2,2-dimethyl-3-tertiary butyloxycarbonyl-5α-acetyloxy-thiazolidine-4-carboxylic acid methyl ester of the formula

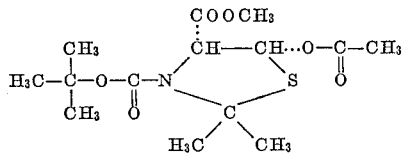

is obtained at 100°/0.001 mm. Hg; $[\alpha]_D^{20} = -331° \pm 1°$ (c.=0.88 in chloroform); infrared absorption spectrum (in methylene chloride) at 5.72, 5.87, 7.35, 8.20, 8.60, 9.30, 9.85 and 10.65μ, the last band being particularly strong and absent in the spectrum of the corresponding L-2,2-dimethyl-3-tertiary butyloxycarbonyl-5β-acetyloxy-thiazolidine-4-carboxylic acid methyl ester.

When treated with sodium acetate in methanol according to the procedure illustrated by example 13, the product yields in good yield the L-2,2-dimethyl-3-tertiary butyloxycarbonyl - 5β-acetyloxy-thiazolidine-4-carboxylic acid methyl ester.

EXAMPLE 25

A solution of 20 g. of the crystalline L-2,2-dimethyl-3-tertiary butyloxycarbonyl-5β-acetyloxy-thiazolidine - 4-carboxylic acid methyl ester and 8 g. of anhydrous sodium acetate in 400 ml. of anhydrous methanol is stirred at room temperature under exclusion of mixture. Stirring is discontinued, as soon as a clear solution is obtained; the latter is allowed to stand at room temperature for 10 days and is then concentrated to a volume of about 100 ml. and, while cooling with ice, slowly treated with 400 ml. of water. As soon as an oily precipitate is formed, the mixture is seeded with a small amount of L-2,2-dimethyl-3 - tertiary butyloxycarbonyl-5β-hydroxy-thiazolidine-4-carboxylic acid methyl ester; after completion of the water addition the reaction mixture is stirred at 0° for another 30 minutes, then filtered and the residue washed with water and dried for 3 days over calcium chloride at 15 mm. pressure. The resulting L-2,2-dimethyl-3-tertiary butyloxycarbonyl - 5β - hydroxy-thiazolidine-4-carboxylic acid methyl ester melts at 92–95°.

From the aqueous extracts a further amount of the crude hydroxy-ester can be obtained by extraction with methylene chloride; the crude material can be purified as follows: 4.8 g. of the crude L-2,2-dimethyl-3-tertiary butyloxycarbonyl-5β-hydroxy-thiazolidine - 4 - carboxylic acid methyl ester in 120 ml. of hexane is filtered through a column of 24 g. of silica gel containing 5% of water. After washing with 180 ml. of hexane, the column is eluted with 200 ml. of a benzene-ethyl acetate mixture; the resulting product melts at 94–98°.

EXAMPLE 26

A solution of 0.773 g. of the crystalline L-2,2-dimethyl-3 - tertiary - butyloxycarbonyl - 5β - acetyloxy - thiazolidine-4-carboxylic acid 2,2,2-trichloroethylester in 12 ml. of methanol is cooled to −10° and treated over a period of 2 minutes with 1.72 ml. of a 1 N aqueous sodium hydroxide solution. After stirring for 18 minutes, the reaction mixture is poured into ice-cooled 2 N aqueous citric acid and the mixture is extracted with methylene chloride. The colorless oil obtained after evaporating the organic solution is chromatographed on 10 g. of silica gel containing 5% water. A small amount of 2,2-dimethyl-3 - tertiary - butyloxycarbonyl-4-thiazoline-4-carboxylic acid 2,2,2-trichloroethylester is eluted with benzene; with methylenechloride the main fraction, i.e. the L-2,2-dimethyl - 3 - tertiary-butyloxycarbonyl-5β-hydroxythiazolidine-4-carboxylic acid 2,2,2-trichloroethylester is washed out, whereas the transesterification product, i.e. the L-2,2-dimethyl - 3 - tertiary - butyloxycarbonyl-5β-hydroxy-thiazolidine-4-carboxylic acid methylester is eluted with methylenechloride containing 10% of methanol. The L-2, 2 - dimethyl-3-tertiary-butyloxycarbonyl-5β-hydroxy-thiazolidine - 4 - carboxylic acid 2,2,2-trichloroethylester crystallizes from a concentrated solution in n-hexane and melts at 104–105°.

What is claimed is:

1. A 5-acyloxy-thiazolidine of the formula

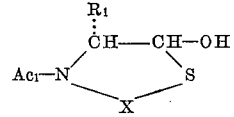

wherein $Ac_1$ is an easily eliminable acyl residue of a semiester of carbonic acid, X stands for the group of the formula

in which each of the groups $R_2$ and $R_3$ is lower alkyl, and $R_1$ represents a member selected from the group consisting of a carboxyl, carboxyl esterified by lower alkanol, carboxyl esterified by halogeno-lower alkanol, carboxyl esterified by phenyl-lower alkanol, carbamyl, N-lower alkanoyl-carbamyl, N-phenylsulfonyl-carbamyl, N-phenylsulfonyl-N-lower alkyl-carbamyl and hydrazinocarbonyl.

2. A compound as claimed in claim 1 and being a compound of the formula

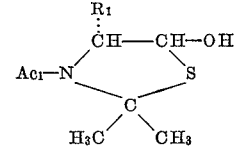

in which $Ac_1$ is the acyl residue of a semiester of carbonic acid, and $R_1$ is a member selected from the group consisting of a free carboxyl group, a carboxyl group esterified with a lower alkanol and a carboxyl group esterified with a halogenated lower alkanol.

3. A compound as claimed in claim 1 and being L-2,2-dimethyl-3-tertiary butyloxycarbonyl-5β-hydroxy-thiazolidine-4-carboxylic acid methyl ester.

4. A compound as claimed in claim 1 and being L-2,2-dimethyl - 3 - tertiary butyloxycarbonyl-5β-hydroxythiazolidine - 4 - carboxylic acid 2,2,2-trichloroethyl ester.

5. A compound as claimed in claim 1 and being L-2,2-dimethyl - 3 -tertiary butyloxycarbonyl - 5β - hydroxy-thiazolidine-4-carboxylic acid diphenylmethyl ester.

References Cited
UNITED STATES PATENTS

| | | | |
|---|---|---|---|
| 2,450,784 | 10/1948 | Duffin et al. | 260—306.7 XR |
| 2,480,079 | 8/1949 | Hunter et al. | 260—306.7 XR |
| 2,580,931 | 1/1952 | Lane | 260—537 |
| 2,721,869 | 10/1955 | D'Amico | 260—306.7 |
| 2,952,673 | 9/1960 | Benghiat et al. | 260—158 |
| 3,159,617 | 12/1964 | Sheehan et al. | 260—306.7 XR |
| 3,399,207 | 8/1968 | Bamberg et al. | 260—306.7 |

OTHER REFERENCES

Strukov: C.A., vol. 47, pp. 2755–2756 (1953).

Wagner et al.: "Synthetic Organic Chemistry," p. 169 (1953).

Woodward et al.: J. Am. Chem. Soc., vol. 88, pp. 852–853 (1966).

FLOYD D. HIGEL, Primary Examiner

U.S. Cl. X.R.

260—158, 243, 483